May 14, 1935.  E. V. McCOLLUM ET AL  2,001,429
METHOD OF MAKING DIP DETERMINATIONS OF GEOLOGICAL STRATA
Filed July 9, 1934   2 Sheets-Sheet 1

INVENTORS
Elton V. McCollum
and George C. McGhee
BY
ATTORNEY

May 14, 1935.  E. V. McCOLLUM ET AL  2,001,429
METHOD OF MAKING DIP DETERMINATIONS OF GEOLOGICAL STRATA
Filed July 9, 1934   2 Sheets-Sheet 2

INVENTORS
Elton V. McCollum
and George C. McGhee
BY
Thos. F. Scofield
ATTORNEY

Patented May 14, 1935

2,001,429

UNITED STATES PATENT OFFICE 2,001,429

METHOD OF MAKING DIP DETERMINATIONS OF GEOLOGICAL STRATA

Elton V. McCollum, Ponca City, Okla., and George C. McGhee, Eunice, La., assignors to Continental Oil Company, Ponca City, Okla., a corporation of Delaware Application July 9, 1934, Serial No. 734,268

2 Claims. (Cl. 181—0.5)

Our invention relates to a method of making dip determinations of geological strata and more particularly to improvements in geophysical prospecting, wherein knowledge of geological structural conditions may be obtained by willfully creating sound or earth vibrations by detonating explosives or other means at or near the surface of the earth and after passage by various unique and well known paths through portions of the earth, the sound may be received by seismometers or similar devices and recorded with proper camera equipment located advantageously with respect to the sound source. For the purposes of this specification sound is construed to include all elastic vibrations and waves, whether they be produced mechanically or by explosions.

More specifically our invention relates to improvements in seismic methods of exploration wherein sound reflected from certain geologic strata differing in physical qualities from adjacent strata is utilized together with the times of passage of the sound through various paths, certain physical coefficients of the material through which the sound passes, and the geometrical relation of the sound source or sources with the seismometer or seismometers, to determine the depths and slopes of the strata for the purpose of locating structures favorable to the accumulation of petroleum or other valuable mineral deposits.

It has long been known that sound could be made to pass through the earth and that certain valuable geological knowledge could be obtained by studying times of transit of sound through the earth's crust together with physical constants peculiar to the material encountered by the sound in its passage. The sedimentary portion of the earth's crust consists in general of stratified layers of different material. The elastic coefficients of contiguous layers often are quite different so that reflection and refraction of sound occur. Because of reflection and refraction a definite part of the sound issuing from the source is caused to return to the surface of the earth after having contacted or having passed through deep lying formations. Thus, we are afforded means of determining depths of strata deeply buried beneath the surface of the earth and certain other information, such as their physical constants, that is valuable from an economic or scientific standpoint. The portion of sound that is reflected or echoed from buried layers and returned directly to the earth's surface where it may be received and recorded has become increasingly important in recent years.

In the prior art the seismograph and its auxiliary apparatus and methods have been used for the detection of, and outlining the shape or contour surface of domes, anticlines or other geological structures. Success has accompanied the work in certain restricted areas but in other areas the seismograph has been of little material aid to the geologist. Extreme variations in the weathered portion of the earth's crust and inability to correlate at all times have definitely limited the usefulness of seismic methods in many instances.

One object of our invention is to provide means whereby dips of buried geological beds or surfaces may be determined that are substantially free from errors caused by heterogeneity in the weathered portion of the earth's crust, thus broadly extending the usefulness of seismic exploration methods.

Another object of our invention is to provide a method of correctly determining dips of buried geological strata or surfaces wherein we utilize a plurality of seismograms obtained from different physical setups involving a plurality of sound sources and a plurality of seismometers in which we do not depend on correlations between individual seismograms of arrivals of sound from identical beds.

In the accompanying drawings which form part of the instant specification and are to be read in conjunction therewith, and in which like reference numerals are used to indicate like parts in the various views.

Figure 1:
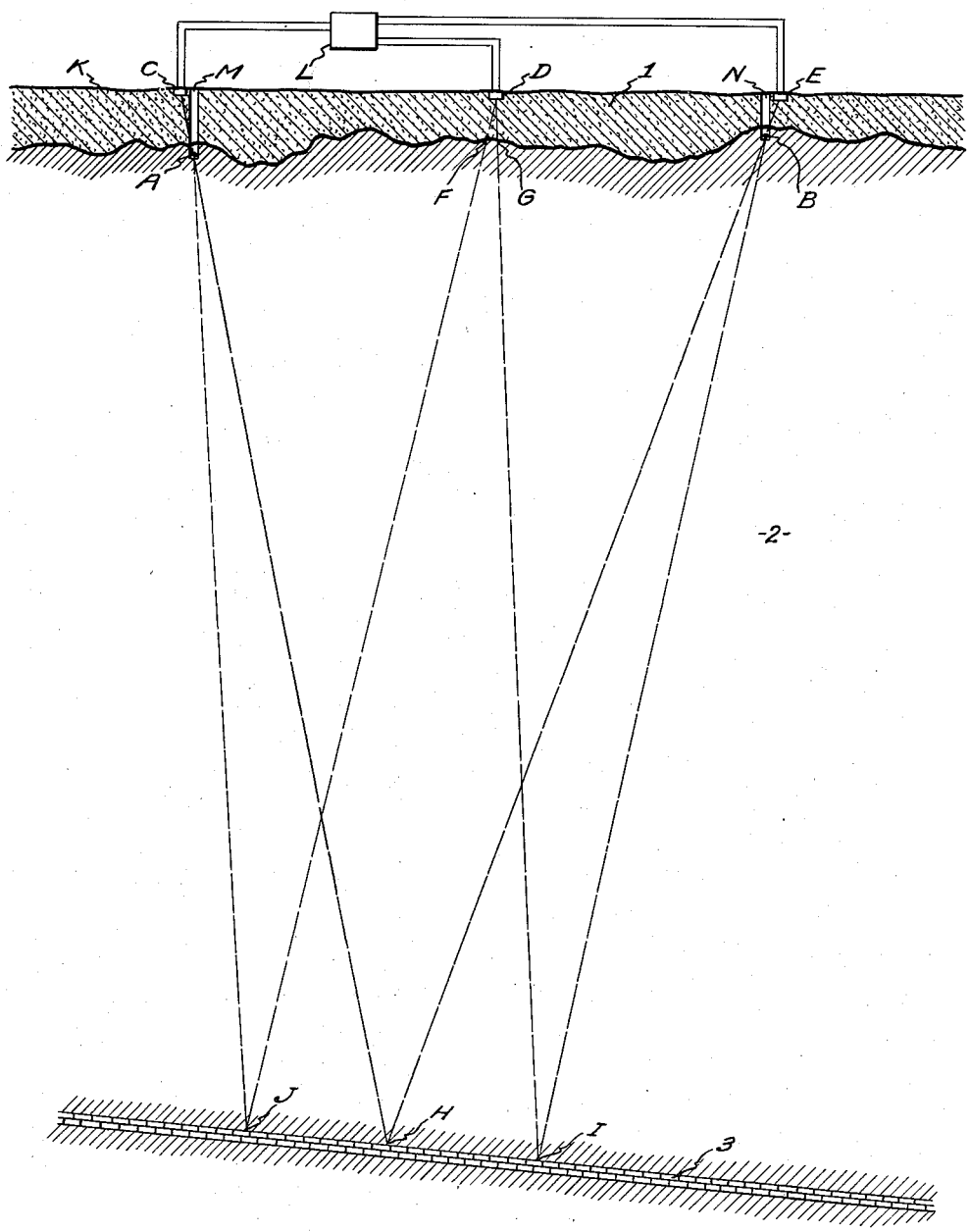
Figure 1 is a geological cross section illustrating typical beds and a preferred arrangement of apparatus suitable for facilitating our invention.

In order to promote a clearer understanding of the improvements we have made we shall review the prior art in so far as to point out the basic principles involved in reflection shooting as it is ordinarily done. A comparison of this review with our method, which will be developed in the specification to follow will make discernable important improvements that have enabled us to prospect areas that are impossible by the older and well known methods.

One common method of using reflected sound is to directly compute the depth to the layers. This may be easily done when the effective velocity of sound in the overburden of the buried layers is known. Ways and means of determining effective velocities are too well known in the art to be treated here. The depths to different definite layers may be determined at a number of points on the earth's surface and contour maps of the buried surface constructed. Such a method shall be called the "correlation method" throughout this discussion since an accurate contour map depends upon the similarity of seismograms taken at different places on the earth's surface and one's ability to match or correlate them.

One source of error in correlation shooting is that the weathered portion of the earth's crust is extremely variable in thickness and in physical characteristics. The determination of the thickness of the weathered layer and the time necessary for passage of sound through it has been done in a number of ways, but accurate determinations are difficult if not altogether impossible in some instances.

Another source of error arises in correlation shooting because geological beds are not always continuous throughout a given area in which information is needed; especially may this be true where structural features such as anticlines or domes exist. Such a condition is very difficult to detect by the correlation method since it is very easy to jump from one bed to another when beds abruptly appear or disappear.

Another common method of utilizing the reflected sound is the dip method in which a plurality of seismometers are arranged at rather closely spaced intervals on a straight line running through the source of sound so that the dip or slope of the beds directly beneath the setup may be obtained. Theoretically only two seismometers need be used with the source of sound. The time of arrival of the sound reflected from a buried layer to the instrument farther away from the source of sound normally is greater than the time of arrival to the instrument setting closer to the sound source. By a normal case we mean when the buried beds are flat, i. e., when they have no dip with respect to the surface of the earth. When the bed is not flat the difference of the times of arrivals to the two seismometers will be less or greater than normal according to whether the shot is taken up-dip or down-dip. One versed in the art can arrive at the proper dip values when he has the data before him. In practice several seismometers are generally set at intermediate points between the two extreme instruments in order to be sure that reflections from the same bed are used from the extreme instruments.

When the thickness of the weathered layer or its physical constituency varies from one seismometer to another, serious errors arise in the dip method as ordinarily applied because the time difference between the instruments will be affected and the computations will lead to erroneous values of dip.

In Figure 1 of the drawings we diagrammatically show a portion of a typical geological cross section. Layer 1 is composed of weathered rock, silt, etc. that is variable in thickness and physical characteristics. Layer 2 consists of unweathered rock of definite elastic characteristics. Layer 3 is of rock that is quite different physically from layer 2 such that sound will be reflected. Many more layers are generally present in a geological cross section but the beds shown are ample to illustrate our invention. Layer 3 is shown inclined with respect to the earth's surface K. When dips of geological layers are known at a number of points in a given area maps can be contoured giving valuable structural information relative to mineral accumulation.

Referring more particularly to Figure 1 we show a source of sound which generally is a detonation of suitable explosives at A in layer 2. The sound source may be placed in layer 2 by drilling or excavating through the weathered layer 1. Sound is sent out in all directions, but we have for the sake of simplicity restricted our drawings to the paths useful in our invention. A portion of the sound from A travels to a seismometer, which is preferably of an electrical type, at C which may be planted on or near the earth's surface near to the top of the drill hole M. Another portion of the sound travels downward through layer 2 where it comes into contact with layer 3 at J. The physical change between the layers causes a portion of the sound to be reflected at J after which it passes back through layer 2 to point F where it encounters the weathered layer 1, thence to a seismometer located at D near the earth's surface. Another portion of the sound traverses essentially the reflection path AHBE, after which it is received by a seismometer located at E. After the various arrivals of sound have been received by the seismometers at C, D and E they are recorded by the recording device at L which preferably consists of proper amplifying and other electrical equipment together with an oscillographic camera.

Figure 3:
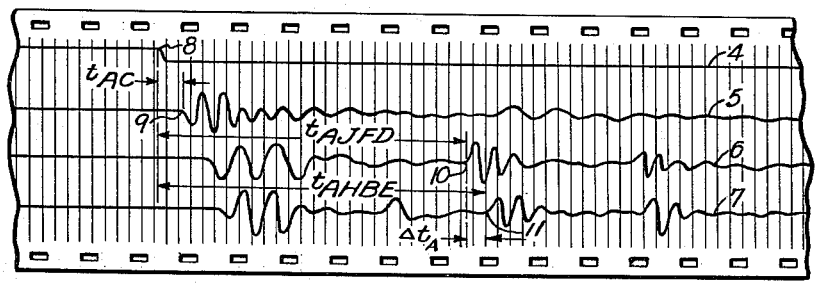
Figure 3 is a diagram illustrating typical features of a seismogram obtained by application of our method with the source of sound located at A of Figure 1.

In Figure 3 we depict a seismogram on which are recorded the arrivals of sound at the seismometers C, D, and E from the source located at A. A seismogram ordinarily consists of a segment from a roll of photographic film or paper which has been driven along at a fairly uniform speed by a rotating drum or other device and on which has been photographed, by means of oscillographs or galvanometers, time signals and various arrivals from the seismometers. The thin parallel lines shown on the diagram divide the seismogram into segments of equal time intervals. Such lines may be put on by a synchronous motor driven by a tuning fork, or other well known methods. A common interval is .01 second, but it may be advantageous at times to select other time intervals. Within recorder L is positioned an oscillograph connected in any suitable manner known to the art, to give the instant of explosion of the charge A. Track 4 is a trace of this oscillograph giving the origin of time of the sound at 8. Track 5 illustrates the arrivals from the seismometer stationed at C. The time for sound to traverse the path AC is obtained by counting the timing lines and fractions thereof falling between 8 and 9. Track 6 denotes the arrivals from the seismometer at D and in particular 10 gives the arrival of the reflected energy along the path AJFD. Track 7 records the various arrivals from the seismometer at E. Counting the timing lines between 8 and 11 gives substantially the time taken for sound to travel along the path AHBE.

Figure 4:
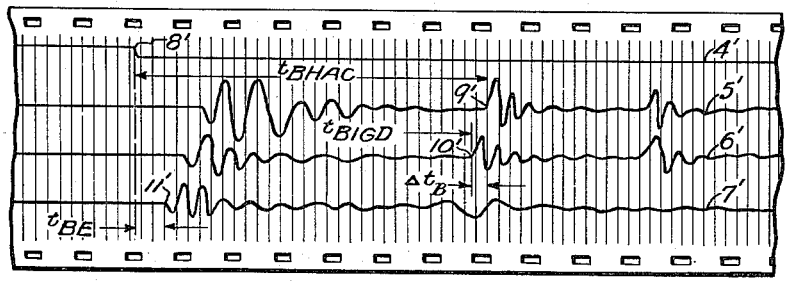
Figure 4 illustrates a seismogram with source of sound located at B.

Likewise Figure 4 is a seismogram taken with the seismometers in the same positions as before but with the source of sound located at B which, similar to the source at A, is planted in the unweathered layer 2 by drilling through the weathered zone 1. Tracks 4', 5', 6' and 7' refer to the same respective galvanometers and seismometers as 4, 5, 6, and 7 of Figure 3. Since 8' gives the origin of time of sound originating at B, the time taken for sound to follow the path BE may be got by evaluating the time between 8' and 11' of Figure 4; the interval between 8' and 10' gives the time for passage of sound over the path BIGD; the time taken to traverse substantially the path BHAC is derived from the number of timing lines between 8' and 9'.

Figure 2:
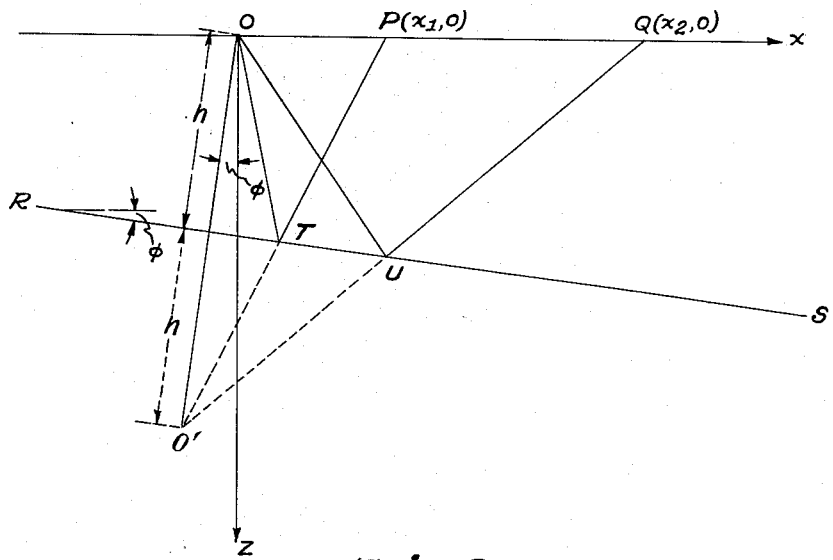
Figure 2 is a simplified diagram to be used in connection with mathematical equations to further clarify our invention.

Figure 2 is a simple geometrical diagram from which we derive equations useful in our method. The origin of a rectangular coordinate system O is chosen coincident with a source of sound; the OX axis is chosen in the earth's surface and for the sake of simplicity is in the general direction of maximum dip; the Z axis is chosen vertically downward. The Y axis does not enter in this simple case but it will be obvious to one versed in mathematics that the following equations can be easily extended to cover three dimensional cases. The line RS represents the trace of a boundary between two geological beds with different physical properties such that the boundary constitutes a reflecting surface for sound. $\phi$ is the angle of dip of RS with respect to the X axis. Seismometers occupy the points P and Q whose coordinates are respectively $(x_1,0)$ and $(x_2,0)$. It is a well known principle in optics that when a reflection occurs the energy from the source travels the same length of path as though it had come from the image of the source in the reflecting plane. The reflection of wave energy traveling through the earth follows the law of reflection of light. An adaption of this principle to Figure 2 shows that the actual path OTP is equivalent to O'TP. The sides of the triangle OO'P are related by application of the law of cosines according to the equation, $$\overline{O'P}^2 = x_1^2 + 4h^2 + 4hx_1 \sin \phi \quad (1)$$

But the length of the path O'P is given by $$O'P = Vt_1 \quad (2)$$

where V is the effective velocity of the material through which the sound has traveled and $t_1$ the time of travel. Substitution of (2) into (1) gives $$t_1 = \frac{1}{V}\left(x_1^2 + 4h^2 + 4hx_1 \sin \phi\right)^{\frac{1}{2}} \quad (3)$$

Similarly the solution of the triangle OO'Q gives, $$t_1 = \frac{1}{V}\left(x_2^2 + 4h^2 + 4hx_2 \sin \phi\right)^{\frac{1}{2}} \quad (4)$$

Subtracting (3) from (4) gives, $$(t_2 - t_1) = \frac{1}{V}\left[(x_2^2 + 4h^2 + 4hx_2 \sin \phi)^{\frac{1}{2}} - (x_1^2 + 4h^2 + 4hx_1 \sin \phi)^{\frac{1}{2}}\right] \quad (5)$$

Equation (5) gives the angle of dip $\phi$ implicitly with respect to the differences in the times of arrival of sound to two seismometers, the effective velocity and certain geometrical properties of the setup. The solution for $\phi$ may be made in a number of ways and is well known to those versed in the art.

Equation (5) may be applied to the seismogram (3) and in this case the origin of the coordinate system will fall at A. The time difference $(t_2-t_1)$ will become $\Delta t_A$ as shown in Figure 3. Such an application is the ordinary method of dip shooting as applied in the art heretofore. It is evident that alternate thickening and thinning of weathering or changing of velocity in the weathered layer will introduce errors into $\Delta t_A$, thence into the dip value.

In the prior art of dip shooting the origin of the coordinate system is chosen at the source of sound. We propose to reverse this procedure and choose the origin of our coordinate system in a seismometer, such as at D of Figure 1. In this particular case we may obtain the time for sound to travel the path AJFD from Figure 3 and the time for sound to travel to path BIGD from Figure 4, the seismograms having been taken at different times and in both cases the source of sound being planted below the weathered layer as described above. An inspection of Figure 1 shows that the weathered portion of the earth traversed by path AJFD is FD and the weathered portion traversed by BIGD is GD. Since the sound paths are so nearly vertical, particularly in the weathered portion because of the refraction occurring when sound passes from layer 2 to layer 1, it is seen that to a very close approximation, $$t_{FD} = t_{GD} \quad (6)$$

Thus by applying Equation (5) to the time difference $t_{BIGD} - t_{AJFD}$ we obtain dip values substantially free from the serious weathering errors present in prior methods.

In our method as pointed out above we depend on correlation from one seismogram to another; for example we assume that $t_{AJFD}$ and $t_{BIGD}$ are from reflections from an identical bed. In extremely difficult areas correlations are not always possible. But we have surmounted such difficulties by still further refinements.

Referring again to Figure 1 we see that sound traversing the path AHBE which originates at the source of sound A substantially passes through the source of sound B before it is received by the seismometer at E; similarly sound from B while in transit along the path BHAC substantially passes through A. We furthermore measure the times $t_{AC}$ and $t_{BE}$ by means of the seismometers at C and E as may be noted in Figures 3 and 4.

Now $$\Delta t_A = t_{AHBE} - t_{AJFD} = (t_{AHB} + t_{BE}) - t_{AJFD} \quad (7)$$

and $$\Delta t_B = t_{BHAC} - t_{BIGD} = (t_{BHA} + t_{AC}) - t_{BIGD} \quad (8)$$

It is apparent that $t_{AHB} = t_{BHA}$ so that when Equation (7) is subtracted from (8) we get, $$(t_{BIGD} - t_{AJFD}) = \Delta t_A - \Delta t_B + t_{AC} - t_{BE} \quad (9)$$

Equation (9) furnishes an increment of time that does not depend on correlation between records. It will be noticed that it is also free of weathering errors as shown by Equation (6). Substitution of Equation (9) into Equation (5) together with the proper velocities and geometrical relationships gives a working equation for our method.

In the description of our invention we have restricted ourselves to a simple case but it is to be understood that the improvements herein outlined can be used in more complicated cases. It takes merely a knowledge of the well known physical laws governing sound paths together with our invention to extend the improvements to paths requiring three dimensions to describe them. We have mentioned only one reflecting bed in our disclosure but obviously the method can be applied to a plurality of beds where such beds exist. We often use several intermediate seismometers stationed between those shown in Figure 1. We have described the sound sources and seismometers as all lying on one straight line but other arrangements may be used if desired.

Having thus described our invention, what we claim is:

1. A method of determining the amount and direction of dip of buried geological strata including the steps of generating vibrations at spaced points below the weathered layer of the earth's surface, and receiving the vibrations after they have traveled through the earth at a point intermediate the vibration generating points.

2. A method of determining the amount and direction of angular dip of buried geological formations including the steps of generating earth vibrations at a pair of spaced points below the weathered layer of the earth's surface, and receiving the vibrations and reflections thereof at points on or near the earth's surface adjacent the vibration generating points and at a point on or near the earth's surface intermediate the vibration generating points.

ELTON V. McCOLLUM.
GEORGE C. McGHEE.